(12) United States Patent
Sensui

(10) Patent No.: US 6,618,560 B2
(45) Date of Patent: Sep. 9, 2003

(54) FOCUS DETECTION DEVICE

(75) Inventor: Takayuki Sensui, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/867,637

(22) Filed: May 31, 2001

(65) Prior Publication Data

US 2001/0048813 A1 Dec. 6, 2001

(30) Foreign Application Priority Data

May 31, 2000 (JP) ........................................ 2000-162706

(51) Int. Cl.$^7$ .............................................. G03B 13/36
(52) U.S. Cl. ...................................... 396/114; 396/121
(58) Field of Search ................................ 396/114, 111, 396/89, 121, 112, 113; 250/201.7, 201.8, 202.2, 221; 359/669

(56) References Cited

U.S. PATENT DOCUMENTS

| | | | |
|---|---|---|---|
| 3,751,136 A | * | 8/1973 | Kirchhoff .................... 359/669 |
| 5,237,167 A | * | 8/1993 | Hibbard ..................... 250/201.8 |
| 5,321,248 A | | 6/1994 | Sensui ...................... 250/201.8 |
| 5,397,887 A | | 3/1995 | Sensui ...................... 250/201.8 |
| 5,420,438 A | | 5/1995 | Sensui et al. ............. 250/201.8 |
| 5,530,236 A | | 6/1996 | Sensui ...................... 250/201.8 |
| 5,870,635 A | | 2/1999 | Shindo et al. ................. 396/96 |
| 6,128,444 A | | 10/2000 | Sensui ......................... 396/114 |

* cited by examiner

Primary Examiner—Russell Adams
Assistant Examiner—Rochelle Blackman
(74) Attorney, Agent, or Firm—Greenblum & Bernstein, P.L.C.

(57) ABSTRACT

A focus detection device is provided with a pupil dividing system, an intensity distribution pattern forming system, a plurality of light receiving elements arranged in a direction where the pupil is divided, a focus detection area defining system having an focus detection opening, the focus detection area defining system being arranged on or in the vicinity of a plane equivalent to a focal plane of the photographing lens, the light passing through the pair of focus detection areas passing through the focus detection opening, a deflection prism arranged between the focus detection opening and the pupil dividing system, and an optical element provided in the vicinity of the pupil dividing system, the optical element having an anamorphic refractive power. A refractive power in the pupil dividing direction is greater than a refractive power in a direction perpendicular to the pupil dividing direction.

22 Claims, 6 Drawing Sheets

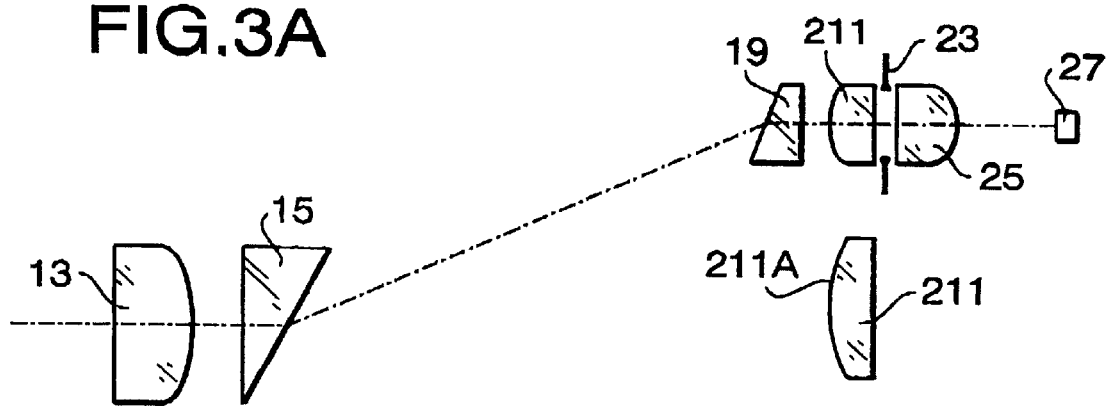
FIG.3A
FIG.3B
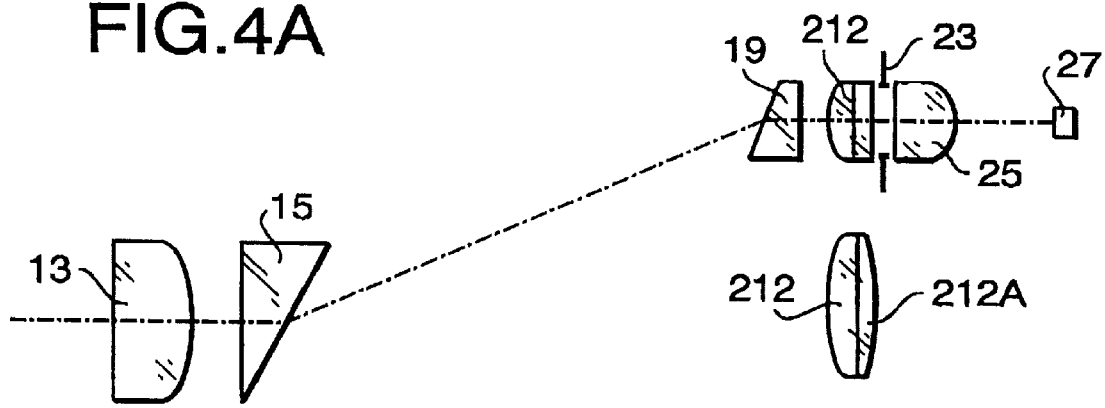
FIG.4A
FIG.4B
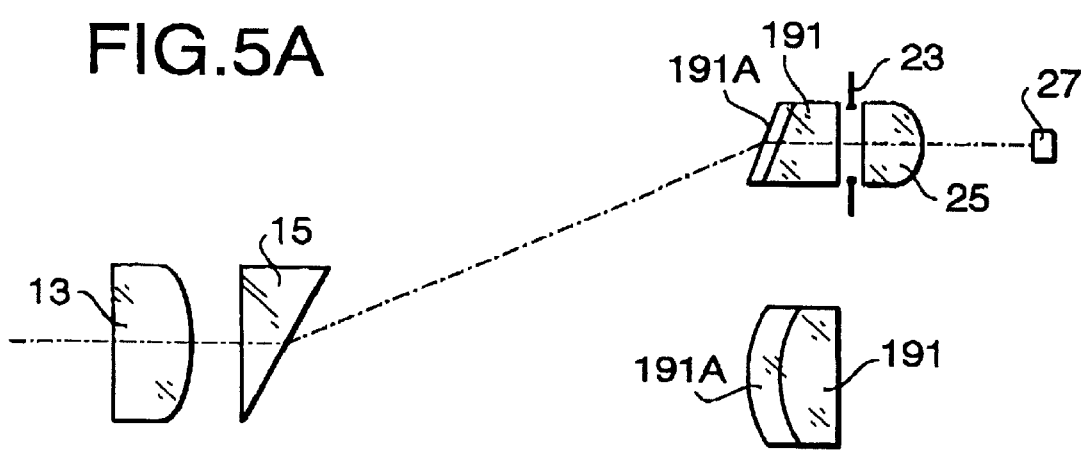
FIG.5A
FIG.5B

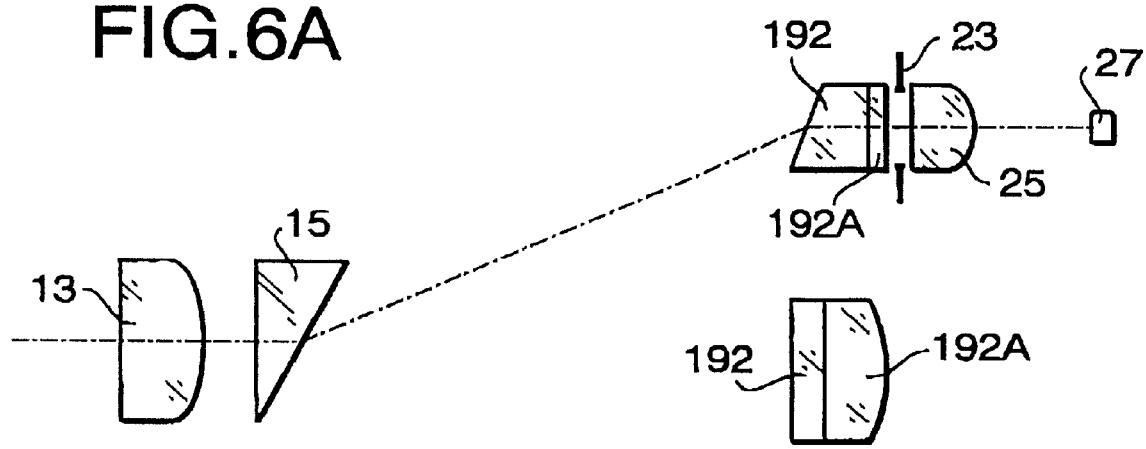
FIG.6A
FIG.6B
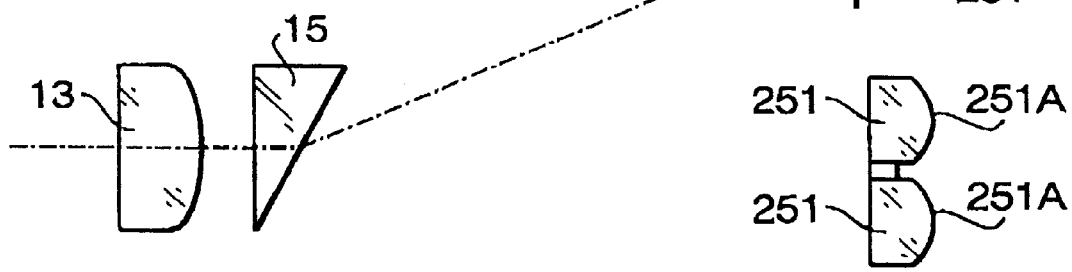
FIG.7A
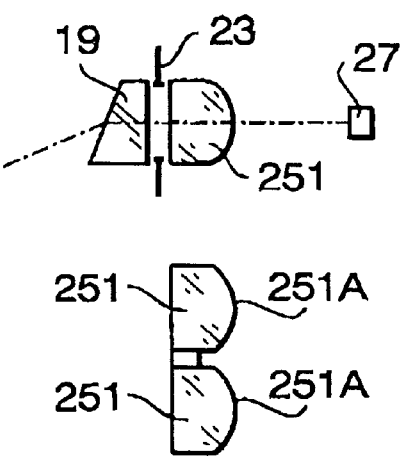
FIG.7B

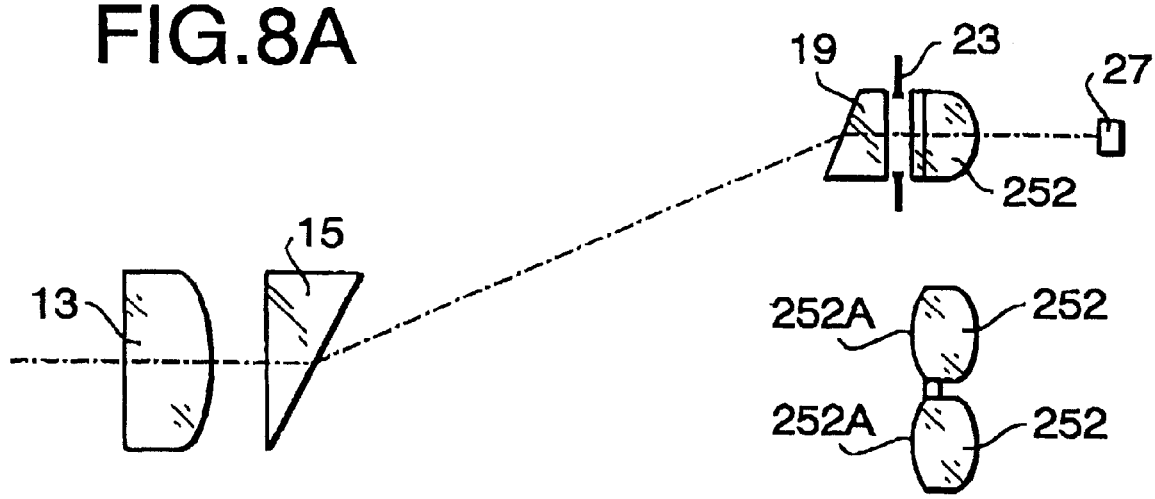
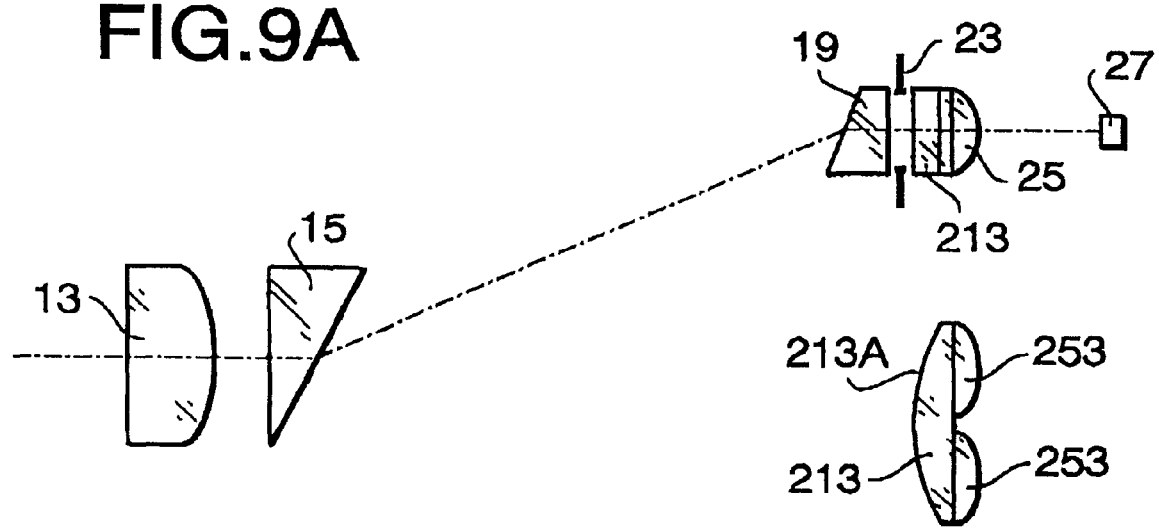

FOCUS DETECTION DEVICE

BACKGROUND OF THE INVENTION

The present invention relates to a focus detection device employing a pupil separating phase difference method, applicable to optical devices such as SLR (single lens reflex) cameras.

Recently, an SLR camera provided with a multi-area focus detection unit has been developed. The multi-area focus detection unit is capable of detecting a focusing condition of a plurality of focus detection areas. An example of such a multi-area focus detection unit is configured as follows.

A plurality of focus detection areas are defined on a plane optically equivalent to a film plane (i.e., a focal plane of the photographing lens). Light from an object is passed through the focus detection areas, which are arranged on and off axis positions, are divided using separating masks, respectively. The divided (pupil-divided) light fluxes are incident on corresponding line sensors, respectively, so that intensity distribution on the line sensors vary depending on the focusing condition of the photographing lens.

In the above-described type of focus detection unit, the light fluxes passed through the focus detection areas are deflected in a direction perpendicular to the pupil-dividing direction using a deflector. The separator optical system including the separator masks and the separator lenses is arranged such that the consistency with respect to the pupil of the photographing lens is maintained by deflecting the light fluxes using the deflector. With this configuration, an optical path length of the light fluxes in each focus detection optical system is maximized within the limited space, and the optical systems may not physically interfere with each other.

In the conventional focus detection unit, the deflector for each optical system is valid only in a direction perpendicular to the pupil-dividing direction. Accordingly, considerable coma is generated in a direction perpendicular to the pupil-dividing direction and the intensity of light illuminating the line sensor is lowered. Further, in the multi-area focus detection unit, in which a plurality of line sensors are arranged in parallel, a light beam incident on a certain line sensor may serve as a stray beam for another line sensor, which lowers an accuracy of the focus detection.

However, if the coma in the direction perpendicular to the pupil-dividing direction is lowered, the size of the spot in the pupil-dividing direction increases, and does not match the size of the line sensor.

SUMMARY OF THE INVENTION

In view of the above, it is therefore an object of the invention to provide an improved focus detection device in which separator optical systems are shifted in a direction perpendicular to the pupil-dividing direction, and the coma of a secondary focal plane is sufficiently corrected.

For the above object, according to the invention, there is provided a focus detection device for a camera having a photographing lens, which is provided with a pupil dividing system that divides a pupil of the photographing lens into a pair of focus detection areas, an intensity distribution pattern forming system that receives light passed through the focus detection areas and forms a pair of intensity distribution patterns, the relative position thereof varying depending on a focusing condition of the photographing lens, a plurality of light receiving elements arranged in a direction where the pupil is divided, a focus detection area defining system having a focus detection opening, the focus detection area defining system being arranged on or in the vicinity of a plane equivalent to a focal plane of the photographing lens, the light passing through the pair of focus detection areas passing through the focus detection opening, a deflection prism arranged between the focus detection opening and the pupil dividing system, the deflection prism deflecting the light passed through the focus detection opening in a direction perpendicular to the pupil dividing direction and an optical axis of the photographing lens, and an optical element provided in the vicinity of the pupil dividing system, the optical element having an anamorphic refractive power, a refractive power in the pupil dividing direction being greater than a refractive power in a direction perpendicular to the pupil dividing direction.

In a particular case, the deflection prism may function as the optical element, the deflection prism being formed such that one surface has the anamorphic refractive power Optionally, the deflection prism may include a first prism arranged in the vicinity of the focus detection opening and a second prism arranged in the vicinity of the pupil dividing system, at least one of a light receiving surface and a light emerging surface of the second prism being formed with the surface having the anamorphic refractive power.

Further optionally, the optical element may include the intensity distribution pattern forming system, a surface having the anamorphic refractive power being formed on the intensity distribution pattern forming system.

In this case, the intensity distribution pattern forming system may have a light receiving surface and a light emerging surface, the surface having the anamorphic refractive power being formed on at least one of the light receiving surface and the light emerging surface.

Still optionally, the optical element may be an element different from the deflection prism or the intensity distribution pattern forming system, the optical element having a light receiving surface and a light emerging surface, the surface having the anamorphic refractive power being formed on at least one of the light receiving surface and the light emerging surface.

In a particular case, the optical element is disposed between the deflection prism and the pupil dividing system.

Further optionally, the optical element may be disposed between the pupil dividing system and the intensity distribution pattern forming system.

Yet optionally, the optical element may be provided with a cylindrical surface whose generatrix extends in a direction perpendicular to both a pupil dividing direction and an optical axis of the photographing lens, the cylindrical surface generating the anamorphic refractive power.

Further optionally, the optical element may have the anamorphic refractive power, and the optical element, the pupil dividing system and the intensity distribution pattern forming system are closely adhered.

According to another aspect of the invention, there is provided a focus detection device for a camera having a photographing lens, which includes a plurality of pupil dividing systems, each of the plurality of pupil dividing systems dividing a pupil of the photographing lens into a pair of focus detection areas, a plurality of intensity distribution pattern forming systems each of which receives light passed through corresponding focus detection areas and forms a pair of intensity distribution patterns, the relative position thereof varying depending on a focusing condition of the photographing lens, a plurality of light receiving elements elongated in a direction where the pupil is divided, the plurality of light receiving elements receiving the plurality of intensity distribution patterns formed by the plurality of intensity distribution pattern forming systems, respectively, a focus detection area defining member having a plurality of focus detection openings, the focus detection area defining member being arranged on or in the vicinity of a plane equivalent to a focal plane of the photographing lens, the light passed through the detection areas passing the focus detection openings, a plurality of deflection prisms respectively arranged between the focus detection openings and the pupil dividing systems, each of the deflection prisms deflecting the light passed through one of the focus detection openings in a direction perpendicular to the pupil dividing direction and an optical axis of the photographing lens, and an optical element provided on or in the vicinity of each of the pupil dividing systems, the optical element having an anamorphic refractive power, a refractive power of the optical element in the pupil dividing direction being greater than a refractive power in a direction perpendicular to the pupil dividing direction.

BRIEF DESCRIPTION OF THE ACCOMPANYING DRAWINGS

FIG. 3A is a side view of an optical system including an optical element according to a first embodiment;

FIG. 3B is a plan view of the optical element according to the first embodiment;

FIG. 4A is a side view of an optical system including an optical element according to a second embodiment;

FIG. 4B is a plan view of the optical element according to the second embodiment;

FIG. 5A is a side view of an optical system including an optical element according to a third embodiment;

FIG. 5B is a plan view of the optical element according to the third embodiment;

FIG. 6A is a side view of an optical system including an optical element according to a fourth embodiment;

FIG. 6B is a plan view of the optical element according to the fourth embodiment;

FIG. 7A is a side view of an optical system including an optical element according to a fifth embodiment;

FIG. 7B is a plan view of the optical element according to the fifth embodiment;

FIG. 8A is a side view of an optical system including an optical element according to a sixth embodiment;

FIG. 8B is a plan view of the optical element according to the sixth embodiment;

FIG. 9A is a side view of an optical system including an optical element according to a seventh embodiment;

FIG. 9B is a plan view of the optical element according to the seventh embodiment.

DESCRIPTION OF THE EMBODIMENTS

Hereinafter, focus detection devices according to first through seventh embodiments will be described with reference to the accompanying drawings.

Figure 1:
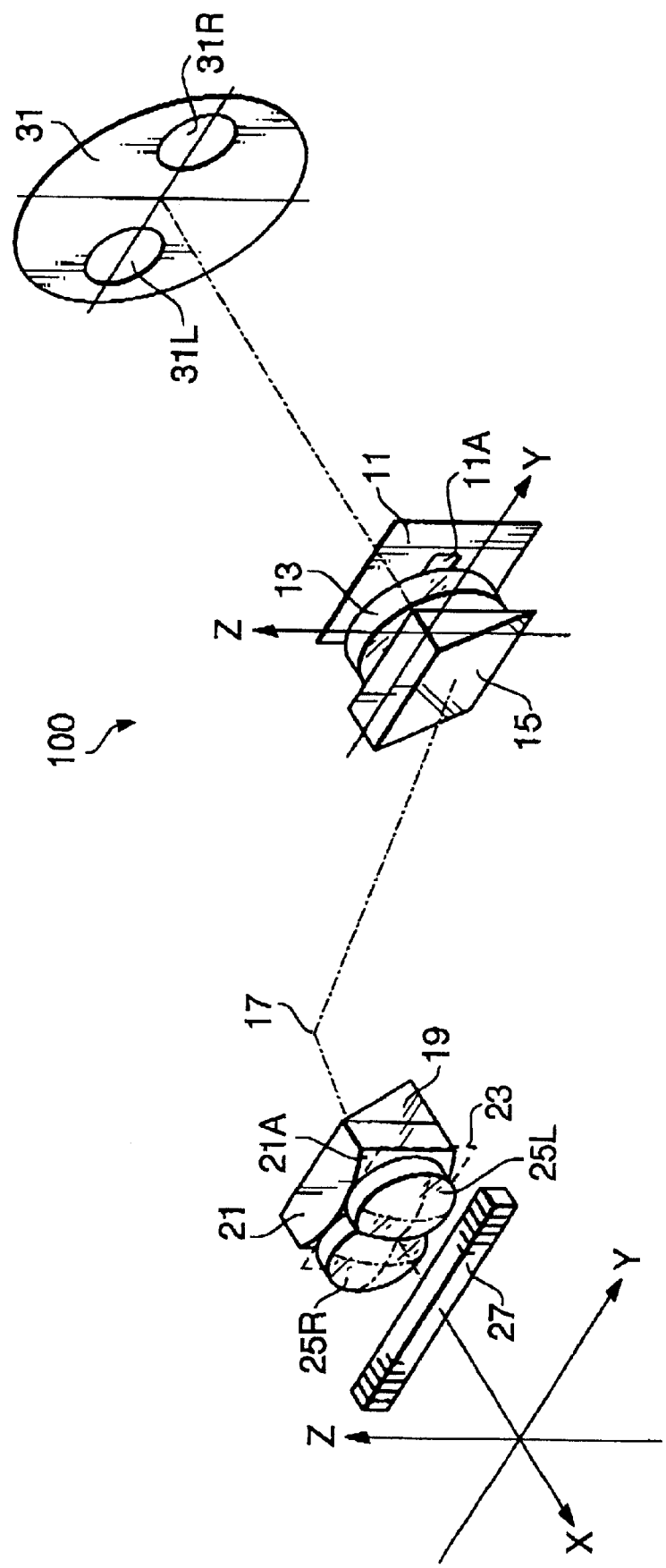
FIG. 1 is a perspective view of an optical system of a focus detection device according to the present invention.

FIG. 1 shows a perspective view of optical elements and optical path of an AF (auto focusing) sensor unit 100 employing the pupil-dividing phase difference method, according to the present invention. As shown in FIG. 1, an area mask 11 provided with a focus detection opening 11A is disposed on a plane which is optically equivalent with respect to the film plane, on which a primary image is formed by a photographing lens of a camera. Alternatively, the area mask 11 may be disposed in the vicinity of the optically equivalent plane.

In order to have a sufficient optical length within a limited small space, the AF sensor unit 100 is configured such that the light passed through the focus detection opening 11A is deflected by deflector and mirror so that the optical path is shifted, and is directed to a line sensor 27 which is arranged at a position offset from the optical axis of the photographing lens.

Hereinafter, front and rear sides are defined such that the light from the object proceeds from the front side toward the rear side. Further, an X-axis is defined as a direction where the light proceeds along the optical axis of the photographing lens, a Y-axis is defined as a direction where a pupil is divided, or a longitudinal direction of the line sensor 27 in which pixels thereof are aligned, and a Z-axis is defined as a direction perpendicular to both the X-axis and Y-axis.

Light fluxes passed through areas 31L and 31R defined on a pupil 31 of the photographing lens are passed through the focus detection opening 11A, and incident on a condenser lens 13. The light fluxes converged by the condenser lens 13 are deflected by a first deflection prism 15, a mirror 17, and a second deflection prism 19. The deflected light fluxes pass through an auxiliary lens 21, passes through a pair of openings formed on a separator mask 23, which functions to divide the pupil. The light fluxes passed through the openings of the separator mask 23 further pass through separator lenses 25L and 25R, and form a pair of object images, or intensity distributions on the line sensor 27. Thus, in the above-described embodiment, the pair of intensity distribution patterns formed on the line sensor 27 correspond to the light fluxes passed through the areas 31L and 31R of the pupil 31, respectively.

In the embodiment described above (shown in FIG. 1), a surface 21A of the auxiliary lens 21, which is on the separator mask 23 side, is formed to be an anamorphic surface whose power in the pupil dividing direction (i.e., Y-axis direction) is larger than the power thereof in the Z-axis direction.

Figure 2:
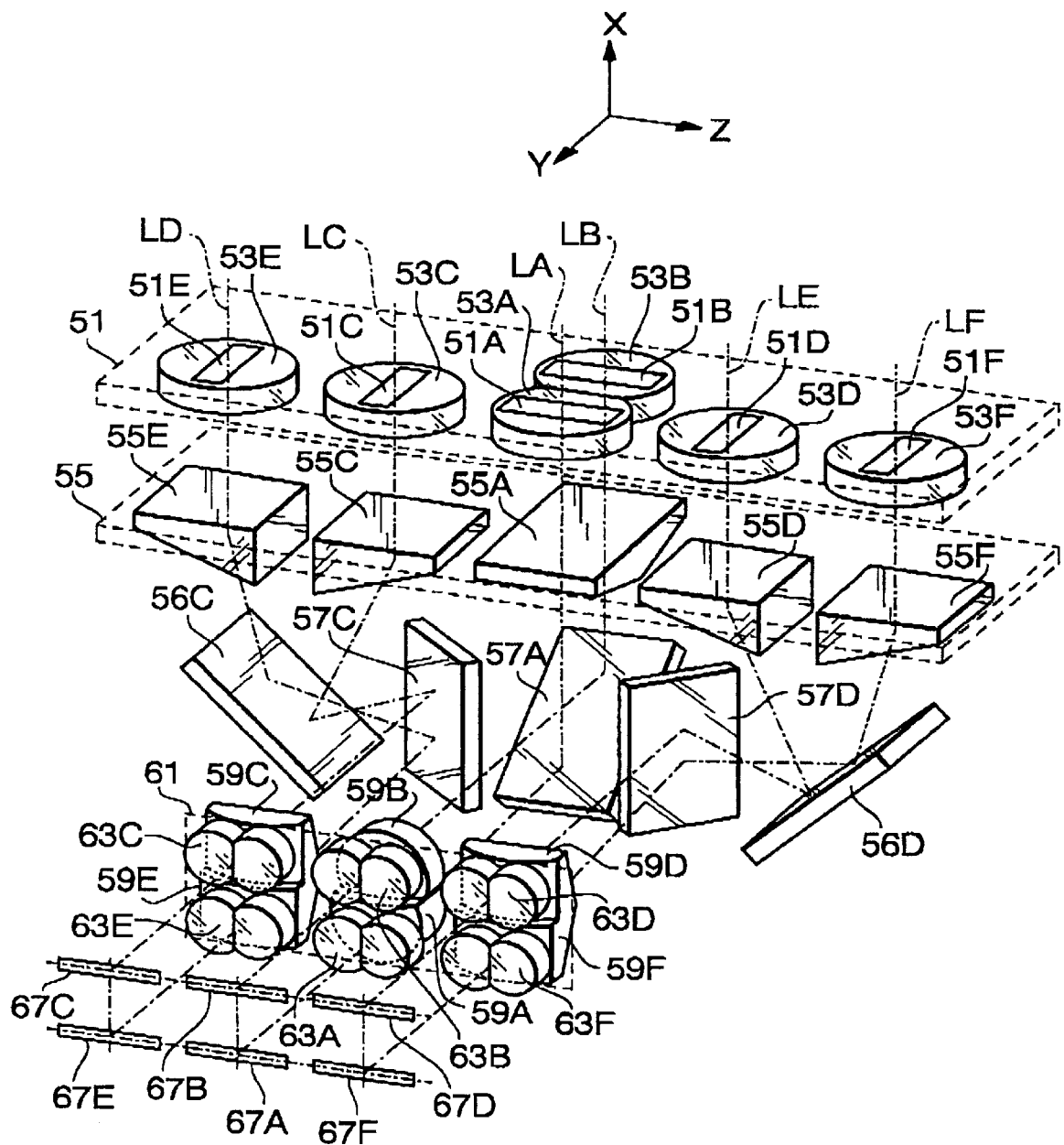
FIG. 2 is a perspective view of a multi-area focus detection device according to an embodiment of the present invention.

FIG. 2 shows an optical path when the present invention is applied to a multi-area focus detection device. It should be noted that, in the embodiment shown in FIG. 2, an anamorphic lens structure is provided on a light emerging surface of a second prism. The power of the anamorphic lens in the Y-axis direction is greater than the power in the Z-axis direction. In the embodiment shown in FIG. 2, an area mask formed with six focus detection openings for defining six focus detection areas are disposed on or in the vicinity of a plane equivalent to the film plane.

The focus detection area mask 51 includes:

a central opening 51A, which is located at a position corresponding to the lower center of a photographing frame, extending in the Z-axis direction;

an upper central opening 51B, which is located at a position corresponding to the upper central position in the photographing frame;

right and left openings 51D and 51C located next to the openings 51A and 51B; and right and left peripheral openings 51F and 51E located at positions on outer sides of the right and left openings 51D and 51C, respectively.

In the present embodiment, the light fluxes, which are from an object, pass through the openings 51A through 51F and form intensity patterns on line sensors 67A thorough 67F, respectively. As shown in FIG. 2, the line sensors 67A through 67F are aligned in two rows, three sensors on each row. Specifically, in one row, line sensors 67C, 67B and 67D are aligned at predetermined intervals, longitudinal direction thereof being aligned in the row. In another row, line sensors 67E, 67A and 67F are aligned at predetermined intervals, longitudinal direction thereof being aligned in the row.

On the rear side of each of the openings 51A through 51F, condenser lenses 53A through 53F are provided, respectively. Further, on the rear side of the condenser lenses 53A and 53B, a deflection prism 55A is provided, and on the rear side of the condenser lenses 53C through 53F, deflection prisms 55C through 55F are provided, respectively.

As shown in FIG. 2, light fluxes LA and LB passed through the condenser lenses 53A and 53B are deflected (refracted) by the deflection prism 55A such that a distance between the light fluxes LA and LB decreases. The light fluxes LA and LB are then reflected by a central mirror 57A at substantially right angles. Thus, the reflected light fluxes LA and LB are directed to the line sensors 67A and 67B, respectively. In the embodiment shown in FIG. 2, the principle ray of the light flux LA coincides with the optical axis of the photographing lens.

The light fluxes LA and LB reflected by the central mirror 57A are deflected by second deflection prisms 59A and 59B such that the principle rays of the light fluxes LA and LB are parallel to each other. Then, each of the light fluxes LA and LB enters corresponding openings on a separator mask 61 and divided into two light fluxes.

Figure 10:
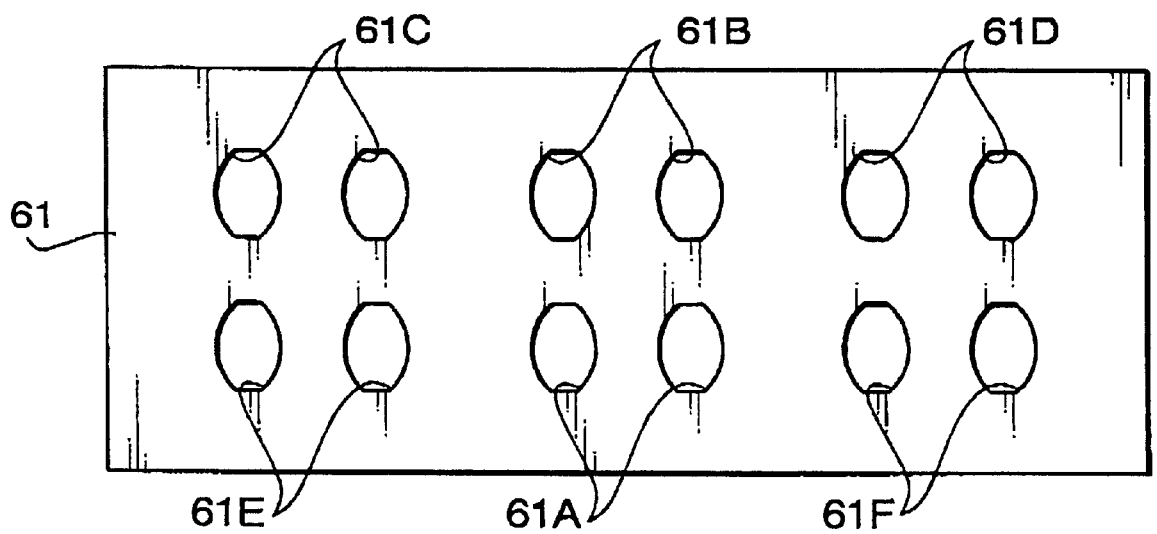
FIG. 10 shows a front view of a separator mask.

FIG. 10 shows a front view of the separator mask 61. As shown in FIG. 10, six pairs of openings 61A, 61B, 61C, 61D, 61E and 61F are formed on the separator mask 61. The pair of openings 61A divides the light flux LA into two light fluxes, and the pair of openings 61B divides the light flux LB into two light fluxes.

Then, the divided light fluxes are incident on corresponding separator lenses 63A and 63B to form intensity patterns (object images) on the line sensors 67A and 67B, respectively. As is well-known in the art, the intensity pattern represents a distance to the object.

Next, the focus detection areas corresponding to the left side of the photographing frame will be described.

Light flux LC which is incident on a condenser lens 53C through the opening 51C is converged by the condenser lens 53C and deflected by the deflection prism 55C such that the light flux LC is away from the light flux LA as it proceeds. The light flux LC is then incident on a first mirror 56C, reflected thereby toward a second peripheral mirror 57C. Then, the light flux LC is reflected by the mirror 57C and is directed toward the line sensor 67C via the prism 59C and the pair of openings 61C.

Light flux LE which is incident on a condenser lens 53E through the opening 51E is converged by the condenser lens 53E and deflected by the deflection prism 55E such that the light flux LE approaches the light flux LC as it proceeds. The light flux LE is then incident on a first mirror 56C, reflected thereby toward the second peripheral mirror 57C. Then, the light flux LE is reflected by the mirror 57C and is directed toward the line sensor 67E via the prism 59E and the pair of openings 61E.

The light fluxes LC and LE reflected by the second peripheral mirror 57C are deflected by the deflection prism 59C such that the principle rays thereof are parallel to each other. The light flux LC passes through the pair of opening 61C and divided into two light fluxes thereby. Then, the divided two light fluxes are incident on the separator lens 63C, which forms a pair of intensity patterns (object images) on the line sensor 67C. Similarly, the light flux LE passes through an opening 61E and is divided into two light fluxes thereby. Then, the divided two light fluxes are incident on the separator lens 63E, which forms a pair of intensity patterns (object images) on the line sensor 67E.

The focus detection areas corresponding to the right side of the photographing frame will be described.

Light flux LD which is incident on a condenser lens 53D through the opening 51D is converged by the condenser lens 53D and deflected by the deflection prism 55D such that the light flux LD is away from the light flux LA as it proceeds. The light flux LD is then incident on a first mirror 56D, reflected thereby toward a second peripheral mirror 57D. Then, the light flux LD is reflected by the mirror 57D and is directed toward the line sensor 67D via the prism 59D and the pair of openings 61D.

Light flux LF which is incident on a condenser lens 53F through the opening 51F is converged by the condenser lens 53F and deflected by the deflection prism 55F such that the light flux LF approaches the light flux LD as it proceeds. The light flux LF is then incident on a first mirror 56D, reflected thereby toward the second peripheral mirror 57D. Then, the light flux LF is reflected by the mirror 57D and is directed toward the line sensor 67F via the prism 59F and the pair of openings 61F.

The light fluxes LD and LF reflected by the second peripheral mirror 57D are deflected by the deflection prism 59D such that the principle rays thereof are parallel to each other. The light flux LD passes through the pair of openings 61D and divided into two light fluxes thereby. Then, the divided two light fluxes are incident on the separator lens 63D, which forms a pair of intensity patterns (object images) on the line sensor 67D. Similarly, the light flux LF passes through the pair of openings 61F and is divided into two light fluxes thereby. Then, the divided two light fluxes are incident on the separator lens 63F, which forms a pair of intensity patterns (object images) on the line sensor 67F.

The multi-area focus detection device shown in FIG. 2 employs optical elements corresponding to the peripheral openings 51C and 51D. The optical elements are formed integrally with the prisms 59C and 59D, respectively, and the light emerging surfaces of the prisms 59C and 59D are formed as anamorphic surfaces, whose power in the pupil-dividing direction is greater than the power in the direction perpendicular to the pupil-dividing direction. In the embodiment, the anamorphic surfaces are cylindrical. With this configuration, coma of the optical systems for the peripheral focus detection areas are well compensated, and thus, appropriate spots, both in size and in shape, can be formed on the sensors 67C and 67D.

Further embodiments will be described with reference to FIGS. 3A–9B. The embodiments described hereafter are applicable to the focus detection device shown in FIG. 1.

FIGS. 3A and 3B show a first modification of the first embodiment, and FIGS. 4A and 4B show a second modification of the first embodiment. In the first and second modifications, an auxiliary lens is provided between the prism 19 and the separator mask 23.

In the modification shown in FIG. 3A, an object side surface 211A of the first auxiliary lens 211 is formed as an anamorphic surface.

In the second modification shown in FIG. 4A, a line sensor side surface 212A of an auxiliary lens 212 is formed as an anamorphic surface.

According to the first and second modifications, only by inserting the auxiliary lens 211 or 212, coma can be compensated.

FIGS. 5A and 5B show a third modification of the first embodiment, and FIGS. 6A and 6B show a fourth modification of the first embodiment. In the third and fourth modifications, a surface having an anamorphic refractive power is formed on a surface of the second deflection prism. In the modification shown in FIG. 5A, an object side surface 212A of the second deflection prism 191 is formed as an anamorphic surface.

In the fourth modification shown in FIG. 6A, a line sensor side surface 192A of the second deflection prism 192 is formed as an anamorphic surface.

According to the third and fourth modifications, coma can be compensated without additional lens or optical elements. Therefore, the number of elements of the device is reduced in comparison to the first or second modification, and manufacturing and adjusting procedure can be facilitated.

FIGS. 7A, 7B, 8A, 8B, 9A and 9B show fifth, sixth and seventh modifications, in which a surface having an anamorphic refractive power is provided on a surface of each separator lens.

In the fifth modification shown in FIGS. 7A and 7B, lines sensor side surfaces 251A of the separator lenses 251 are formed to be anamorphic.

In the sixth modification shown in FIGS. 8A and 8B, object side surfaces 252A of the separator lenses 252 are formed to be anamorphic surfaces.

According to the fifth and sixth modifications, coma can be compensated without additional lens or optical elements. Therefore, the number of elements of the device is reduced in comparison to the first or second modification, and manufacturing and adjusting procedure can be facilitated.

FIGS. 9A and 9B show a seventh modification. In the seventh modification, a pair of separator lenses 25 are integrated using a single auxiliary lens 213, and an object side surface 213A of the auxiliary lens 213 is formed as an anamorphic surface. With this structure, a mold for the lens can be made easily.

The separator lenses are formed of synthetic material, and it is preferable that not only the corresponding pair of separator lenses but all the separator lenses of a focus detecting device are formed on a single plate. Similarly, it is preferable that all the second prisms are made of synthetic resin and formed on a single plate.

In the embodiments and modifications above, the anamorphic surface can be a cylindrical surface. In particular, in the fifth, sixth or seventh modification, in which the anamorphic surface is formed on the separator lens, if the anamorphic surface is realized by the cylindrical surface, it is preferable that a central axis of the cylinder is directed to extend in a direction perpendicular to the pupil-dividing direction and the optical axis of the photographing lens, and position at the center of the optical axes of the separator lens.

As described above, in a focus detecting device in which a separator optical system is shifted in a direction perpendicular to the pupil-dividing system, an anamorphic optical element is provided on or in the vicinity of a pupil dividing system. Since the refractive power of the anamorphic optical element is greater in the pupil-dividing direction than the refractive power in the direction perpendicular to the pupil-dividing direction, coma is compensated in a secondary image plane in a direction perpendicular to the pupil-dividing direction. Accordingly, accurate focus detection can be achieved for a relatively wide focus detecting area.

The present disclosure relates to the subject matter contained in Japanese Patent Application No. 2000-162706, filed on May 31, 2000, which is expressly incorporated herein by reference in its entirety.

What is claimed is:

1. A focus detection device for a camera having a photographing lens, comprising:

a pupil dividing system that divides a pupil of the photographing lens into a pair of focus detection areas;

an intensity distribution pattern forming system that receives light passed through said focus detection areas and forms a pair of intensity distribution patterns, a relative position thereof varying depending on a focusing condition of the photographing lens;

a plurality of light receiving elements arranged in a direction where the pupil is divided;

a focus detection area defining system that has a focus detection opening, said focus detection area defining system being arranged on or in a vicinity of a plane equivalent to a focal plane of the photographing lens, light passing through said pair of focus detection areas passing through said focus detection opening;

a deflection prism arranged between said focus detection opening and said pupil dividing system, said deflection prism deflecting the light passed through said focus detection opening in a direction perpendicular to the pupil dividing direction and an optical axis of the photographing lens; and an optical element provided in a vicinity of said pupil dividing system, said optical element having an anamorphic refractive power, a refractive power in the pupil dividing direction being greater than a refractive power in a direction perpendicular to the pupil dividing direction.

2. The focus detection device according to claim 1, wherein said deflection prism functions as said optical element, said deflection prism being formed such that one surface has the anamorphic refractive power.

3. The focus detection device according to claim 2, wherein said deflection prism includes a first prism arranged in the vicinity of said focus detection opening and a second prism arranged in the vicinity of said pupil dividing system, at least one of a light receiving surface and a light emerging surface of said second prism being formed with the surface having the anamorphic refractive power.

4. The focus detection device according to claim 1, wherein said optical element includes said intensity distribution pattern forming system, a surface having the anamorphic refractive power being formed on said intensity distribution pattern forming system.

5. The focus detection device according to claim 4, wherein said intensity distribution pattern forming system has a light receiving surface and a light emerging surface, the surface having the anamorphic refractive power being formed on at least one of said light receiving surface and said light emerging surface.

6. The focus detection device according to claim 1, wherein said optical element is an element different from said deflection prism or said intensity distribution pattern forming system, said optical element having a light receiving surface and a light emerging surface, the surface having the anamorphic refractive power being formed on at least one of said light receiving surface and said light emerging surface.

7. A focus detection device for a camera having a photographing lens, comprising:

a pupil dividing system that divides a pupil of the photographing lens into a pair of focus detection areas;

an intensity distribution pattern forming system that receives light passed through said focus detection areas and forms a pair of intensity distribution patterns, a relative position thereof varying depending on a focusing condition of the photographing lens;

a plurality of light receiving elements arranged in a direction where the pupil is divided;

a focus detection area defining system that has a focus detection opening, said focus detection area defining system being arranged on or in a vicinity of a plane equivalent to a focal plane of the photographing lens, light passing through said pair of focus detection areas passing through said focus detection opening;

a deflection prism arranged between said focus detection opening and said pupil dividing system, said deflection prism deflecting the light passed through said focus detection opening in a direction perpendicular to the pupil dividing direction and an optical axis of the photographing lens; and an optical element provided in a vicinity of said pupil dividing system, said optical element having an anamorphic refractive power, a refractive power in the pupil dividing direction being greater than a refractive power in a direction perpendicular to the pupil dividing direction, wherein said optical element is an element different from one of said deflection prism and said intensity distribution pattern forming system, said optical element having a light receiving surface and a light emerging surface, a surface having the anamorphic refractive power being formed on at least one of said light receiving surface and said light emerging surface, said optical element being disposed between said deflection prism and said pupil dividing system.

8. The focus detection device according to claim 6, wherein said optical element is disposed between said pupil dividing system and said intensity distribution pattern forming system.

9. The focus detection device according to claim 1, wherein said optical element has a cylindrical surface whose generatrix extends in a direction perpendicular to both a pupil dividing direction and an optical axis of the photographing lens, said cylindrical surface generating the anamorphic refractive power.

10. The focus detection device according to claim 1, said optical element having the anamorphic refractive power, said pupil dividing system and said intensity distribution pattern forming system are closely adhered.

11. A focus detection device for a camera having a photographing lens, comprising:

a plurality of pupil dividing systems, each of said plurality of pupil dividing systems dividing a pupil of the photographing lens into a pair of focus detection areas;

a plurality of intensity distribution pattern forming systems, each of which receives light passed through corresponding focus detection areas and forms a pair of intensity distribution patterns, a relative position thereof varying depending on a focusing condition of the photographing lens;

a plurality of light receiving elements elongated in a direction where the pupil is divided, said plurality of light receiving elements receiving the plurality of intensity distribution patterns formed by said plurality of intensity distribution pattern forming systems, respectively;

a focus detection area defining member that has a plurality of focus detection openings, said focus detection area defining member being arranged on or in a vicinity of a plane equivalent to a focal plane of the photographing lens, light passed through said detection areas passing said focus detection openings;

a plurality of deflection prisms respectively arranged between said focus detection openings and said pupil dividing systems, each of said deflection prisms deflecting the light passed through one of said focus detection openings in a direction perpendicular to the pupil dividing direction and an optical axis of the photographing lens; and an optical element provided on or in a vicinity of each of said pupil dividing systems, said optical element having an anamorphic refractive power, a refractive power of said optical element in the pupil dividing direction being greater than a refractive power in a direction perpendicular to the pupil dividing direction.

12. The focus detection device according to claim 11, wherein each of said deflection prisms functions as said optical element, each of said deflection prisms being formed such that one surface has the anamorphic refractive power.

13. The focus detection device according to claim 12, wherein each of said deflection prisms includes a first prism arranged in the vicinity of said focus detection opening and a second prism arranged in the vicinity of said pupil dividing system, at least one of a light receiving surface and a light emerging surface of said second prism being formed with the surface having the anamorphic refractive power.

14. The focus detection device according to claim 11, wherein said optical elements include said intensity distribution pattern forming system, respectively, a surface having the anamorphic refractive power being formed on each of said intensity distribution pattern forming systems.

15. The focus detection device according to claim 14, wherein each of said intensity distribution pattern forming systems has a light receiving surface and a light emerging surface, the surface having the anamorphic refractive power being formed on at least one of said light receiving surface and said light emerging surface.

16. The focus detection device according to claim 11, wherein said optical element are elements different from said deflection prisms or said intensity distribution pattern forming systems, each of said optical elements having a light receiving surface and a light emerging surface, the surface having the anamorphic refractive power being formed on at least one of said light receiving surface and said light emerging surface.

17. A focus detection device for a camera having a photographing lens, comprising:

a plurality of pupil dividing systems, each of said plurality of pupil dividing systems dividing a pupil of the photographing lens into a pair of focus detection areas;

a plurality of intensity distribution pattern forming systems, each of which receives light passed through corresponding focus detection areas and forms a pair of intensity distribution patterns, a relative position thereof varying depending on a focusing condition of the photographing lens;

a plurality of light receiving elements elongated in a direction where the pupil is divided, said plurality of light receiving elements receiving the plurality of intensity distribution patterns formed by said plurality of intensity distribution pattern forming systems, respectively;

a focus detection area defining member that has a plurality of focus detection openings, said focus detection area defining member being arranged on or in a vicinity of a plane equivalent to a focal plane of the photographing lens, light passed through said detection areas passing said focus detection openings;

a plurality of deflection prisms respectively arranged between said focus detection openings and said pupil dividing systems, each of said deflection prisms deflecting the light passed through one of said focus detection openings in a direction perpendicular to the pupil dividing direction and an optical axis of the photographing lens; and an optical element provided on or in a vicinity of each of said pupil dividing systems, said optical element having an anamorphic refractive power, a refractive power of said optical element in the pupil dividing direction being greater than a refractive power in a direction perpendicular to the pupil dividing direction, wherein said optical element are elements different from said deflection prisms or said intensity distribution pattern forming systems, each of said optical elements having a light receiving surface and a light emerging surface, a surface having the anamorphic refractive power being formed on at least one of said light receiving surface and said light emerging surface, said optical elements being respectively disposed between said deflection prisms and said pupil dividing systems.

18. The focus detection device according to claim 16, wherein said optical elements are respectively disposed between said pupil dividing systems and said intensity distribution pattern forming systems.

19. The focus detection device according to claim 11, wherein each of said optical elements has a cylindrical surface whose generatrix extends in a direction perpendicular to both a pupil dividing direction and an optical axis of the photographing lens, said cylindrical surface generating the anamorphic refractive power.

20. The focus detection device according to claim 11, each of said optical elements having the anamorphic refractive power, said pupil dividing systems and said intensity distribution pattern forming systems being closely adhered, respectively.

21. The focus detection device of claim 1, wherein said optical element compensates for coma.

22. The focus detection device of claim 11, wherein said optical element compensates for coma.

* * * * *